US012792787B2

(12) United States Patent
Tang et al.

(10) Patent No.: US 12,792,787 B2
(45) Date of Patent: Nov. 10, 2026

(54) REAL-TIME PROTECTION FOR MOBILE DEVICES FROM SHOULDER

(71) Applicant: The Regents of The University of Michigan, Ann Arbor, MI (US)

(72) Inventors: Brian Jay Tang, Ann Arbor, MI (US); Kang G. Shin, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 70 days.

(21) Appl. No.: 18/671,105

(22) Filed: May 22, 2024

(65) Prior Publication Data

US 2025/0217522 A1 Jul. 3, 2025

Related U.S. Application Data

(60) Provisional application No. 63/468,650, filed on May 24, 2023.

(51) Int. Cl.
*G06F 21/84* (2013.01)
*G06T 5/70* (2024.01)
*G06T 5/90* (2024.01)

(52) U.S. Cl.
CPC ................ *G06F 21/84* (2013.01); *G06T 5/70* (2024.01); *G06T 5/90* (2024.01)

(58) Field of Classification Search
CPC ....... G06F 21/84; G06F 21/6245; G06T 5/70; G06T 5/90; H04W 12/02; H04N 21/4318
See application file for complete search history.

(56) References Cited

U.S. PATENT DOCUMENTS

2018/0046814 A1 2/2018 Manoharan et al.
2020/0110301 A1* 4/2020 Harrold ............ G02F 1/133509
2021/0209216 A1 7/2021 Baik et al.

FOREIGN PATENT DOCUMENTS

JP 2019191443 A 10/2019
KR 101354609 B1 1/2014
KR 20160066425 A 6/2016

OTHER PUBLICATIONS

International Search Report and Written Opinion of the ISA issued in PCT/US2024/030935, mailed May 19, 2025 ISA/KR.
International Preliminary Report on Patenatability issued in related application PCT/US2024/030935, dated Dec. 4, 2025.

* cited by examiner

*Primary Examiner* — Izunna Okeke
(74) *Attorney, Agent, or Firm* — Harness, Dickey & Pierce, P.L.C.

(57) ABSTRACT

People use mobile devices ubiquitously for computing, communication, storage, web browsing, and more. Shoulder surfing occurs when a person near a mobile user peeks at the user's mobile device, potentially acquiring passcodes, PINs, browsing behavior, or other personal information. A technique is presented to protect information on a mobile device from shoulder surfing. The technique is designed to protect all types of on-screen information in real time, without any serious impediment to users' interactions with their mobile devices. In particular, images are generated that appear readable at close distances, but appear blurry or pixelated at farther distances and wider angles. This approach is capable of protecting on-screen information from shoulder surfers, operating in real time, and being minimally intrusive to the intended users.

16 Claims, 11 Drawing Sheets

SSIM scores with different grid sizes.

SSIM scores with different downscaling sizes.

REAL-TIME PROTECTION FOR MOBILE DEVICES FROM SHOULDER

CROSS-REFERENCE TO RELATED APPLICATIONS

This application claims the benefit and priority of U.S. Provisional Application No. 63/468,650 filed on May 24, 2023. The entire disclosure of the above application is incorporated herein by reference.

GOVERNMENT CLAUSE

This invention was made with government support under W911NF-21-1-0057 awarded by the U.S. Army. The government has certain rights in the invention.

FIELD

The present disclosure relates to protecting information on a mobile device from shoulder surfing.

BACKGROUND

Mobile devices, such as smartphones, laptops, and tablets, have become ubiquitous throughout society. People use them anytime and anywhere to communicate, store data, browse content, and improve their lives. The information accessed and stored within mobile devices, such as financial and health information, text messages, photos, and emails, is often sensitive and private.

Despite the private nature of information stored in mobile devices, people often choose to use them in public areas. This leaves users susceptible to a simple yet effective attack—shoulder surfing. Shoulder surfing occurs when a person near a mobile device peeks at the user's screen, potentially acquiring sensitive passcodes, PINs, browsing behavior, or other personal information. This form of visual hacking dates back to the 1980s when shoulder surfing occurred near public pay phones to steal calling card digits. Shoulder surfing can be combined with other tools such as cameras or binoculars to increase the effectiveness of stealing information.

Studies have shown that lack of screen protection leaked information in 91% of shoulder surfing incidents. Another study indicated that 85% of shoulder surfers acknowledged they observed sensitive information they were not authorized to see, such as login credentials, personal information, contact lists, and financial information. Experiments indicate that you can hack into Snapchat or PayPal accounts by peeking at 2-factor authentication codes as they appear on a victim's mobile device screen. Shoulder surfing was also found to cause negative feelings and induce behavior changes.

Research has also demonstrated that shoulder surfers can obtain a 6-digit PIN 10.8% of the time with just one peek. While a person can limit his/her device's susceptibility to shoulder surfing by moving to a more private location, covering its screen, or turning its display away, these measures are not always feasible/effective (e.g., using a smartphone on a bus or airplane, using a laptop in an office or cafe). These privacy-preserving behaviors are typically employed as a response to protect against "detected" shoulder surfers, but studies have shown that mobile device users are aware of only 7% of shoulder surfing incidents. The vast majority of shoulder surfing incidents and information leakage goes unnoticed, making it challenging for users to manually prevent information from being seen by shoulder surfers. Thus, effective defenses either automatically detect and notify users of unauthorized shoulder surfers, or continuously obfuscate information from potential shoulder surfers.

Users who seek protection against shoulder surfing may wish to hide sensitive information, keep others from stealing or peeking at login/PIN credentials, or desire peace of mind by having more control over private information. Many solutions have been proposed to thwart shoulder surfing, but each have their own drawbacks. One commonly used privacy-preserving mechanism is a privacy film that can be attached to screen of a mobile device screen. These privacy films only allow light from the mobile device display to pass through the film within a narrow viewing angle. Users can attach privacy films over their smartphone screen to prevent attackers outside of a certain viewing angle from seeing any content displayed on the smartphone's screen. However, screens covered with privacy films are still susceptible to shoulder surfers directly behind the user.

Security researchers have explored various other defenses against shoulder surfing. They can be categorized into three main screen protection types: 1) shoulder surfer detection, 2) software solutions, and 3) authentication-specific approaches. Each of these solutions has its own advantages and drawbacks. No software-based defense has been developed for protecting the real-time usage of mobile devices, such as watching videos, playing games, and interacting with UI animations. Prior solutions are neither comprehensive nor capable of protecting all types of information from leaking to shoulder surfers.

This section provides background information related to the present disclosure which is not necessarily prior art.

SUMMARY

This section provides a general summary of the disclosure, and is not a comprehensive disclosure of its full scope or all of its features.

A computer-implemented method is presented for displaying an image on a display device. The method includes: receiving an input image to be displayed on a display device; blurring the input image to create a target image; computing a complementary image by complement=$(\text{targ}^2*2)-\text{img}^2$, where targ is the target image, img is the input image and complement is the complementary image; generating a checkerboard pattern having dimensions same as the input image; computing a delta image by delta=$(\text{complement}-\text{img}^2)*\text{grid}$, where grid is the checkboard pattern and delta is the delta image; computing a protected image by newimg=square root of $(\text{img}^2+\text{delta})$, where newimg is the protected image; and displaying the protected image on the display device.

The method may further include decreasing contrast of the input image and thereby increase privacy protection.

In one aspect, the input image is blurred using a Gaussian function. More specifically, an input indicating a degree of privacy protection is received and the input image is blurred in accordance with the input, where the input correlates to standard deviation of the Gaussian function.

In another aspect, a checkerboard pattern is generated by calculating size of each square in the checkerboard pattern as a function of an anticipated viewing distance between the display device and a user, pixel density of the display device, and size of content to be displayed on the display device.

Alternatively, the checkboard pattern is generated by sizing each square of the checkboard pattern to be size of one pixel of the display device.

It is envisioned that blurring the input image and generating a checkerboard pattern is performed concurrently. It is also envisioned that computing a complementary image, a delta image and a protected image are performed on an entire image or subset thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a diagram depicting an example threat model.

FIG. 2 provides an overview of a protection mechanism in accordance with this disclosure.

Corresponding reference numerals indicate corresponding parts throughout the several views of the drawings.

DETAILED DESCRIPTION

A typical shoulder surfing adversary is a curious or malicious person who seeks to observe or steal the information displayed on a victim's device. Most shoulder surfers do not wish to get caught, and hence we assume they would gather information stealthily, i.e., the adversary peeks at the victim's screen either from an angle or a distance behind the victim. In realistic scenarios, an adversary who can view information on a victim's device is sitting either behind or next to the victim (e.g., public transportation seating, cafe, restaurant, auditorium, lecture, or office settings).

Figure 1:
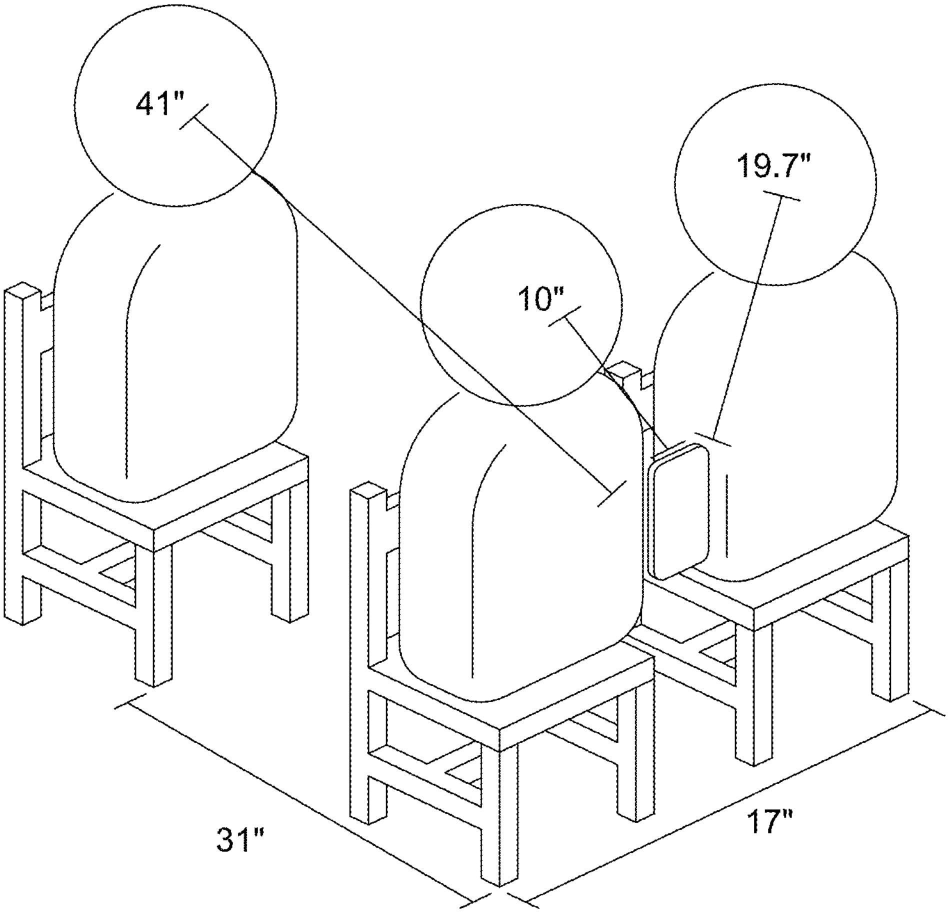

FIG. 1 depicts an example threat model. In an airline setting, the standard seat pitch is 31", and the standard seat width is 17". The majority of smartphone screen sizes are between 5" and 7", with a resolution between 720×1280 and 1440×2960, with most users operating them at a distance of 10". A protection mechanism should thus protect on-screen information from adversaries 41" directly behind the user's screen and 20" beside the user's screen. For demonstration purposes, these measurements are used as the baseline setting and threat model for an experimental evaluation.

Assume that the adversary can either peek at the screen or use a camera to record the content on the victim's device. Since most shoulder surfing incidents are known to be out of curiosity rather than with malicious intent, the proposed protection mechanism is not designed with the intent of protecting victims from adversaries using highly sophisticated tools or attacks. This, in turn, keeps the deployment of the protection mechanism easy and inexpensive. It is also assumed that the adversary is interested in any type of content displayed on the victim's screen, not just passwords, text, or PIN entry.

In this disclosure, the protection mechanism is designed to present the original screen content with only minor quality degradation to the intended user, but it can render shoulder surfers beyond a certain distance/angle away from the screen unable to discern the screen content. The protection mechanism achieves this by leveraging the fact that at a sufficient distance, it is impossible for an optical system to distinguish between two nearby light sources. By applying this theory of resolving power, one can construct checkered grids of pixels that can appear individually discernable at a close distance, but appear as a uniform average of the projected colors.

Figure 2:
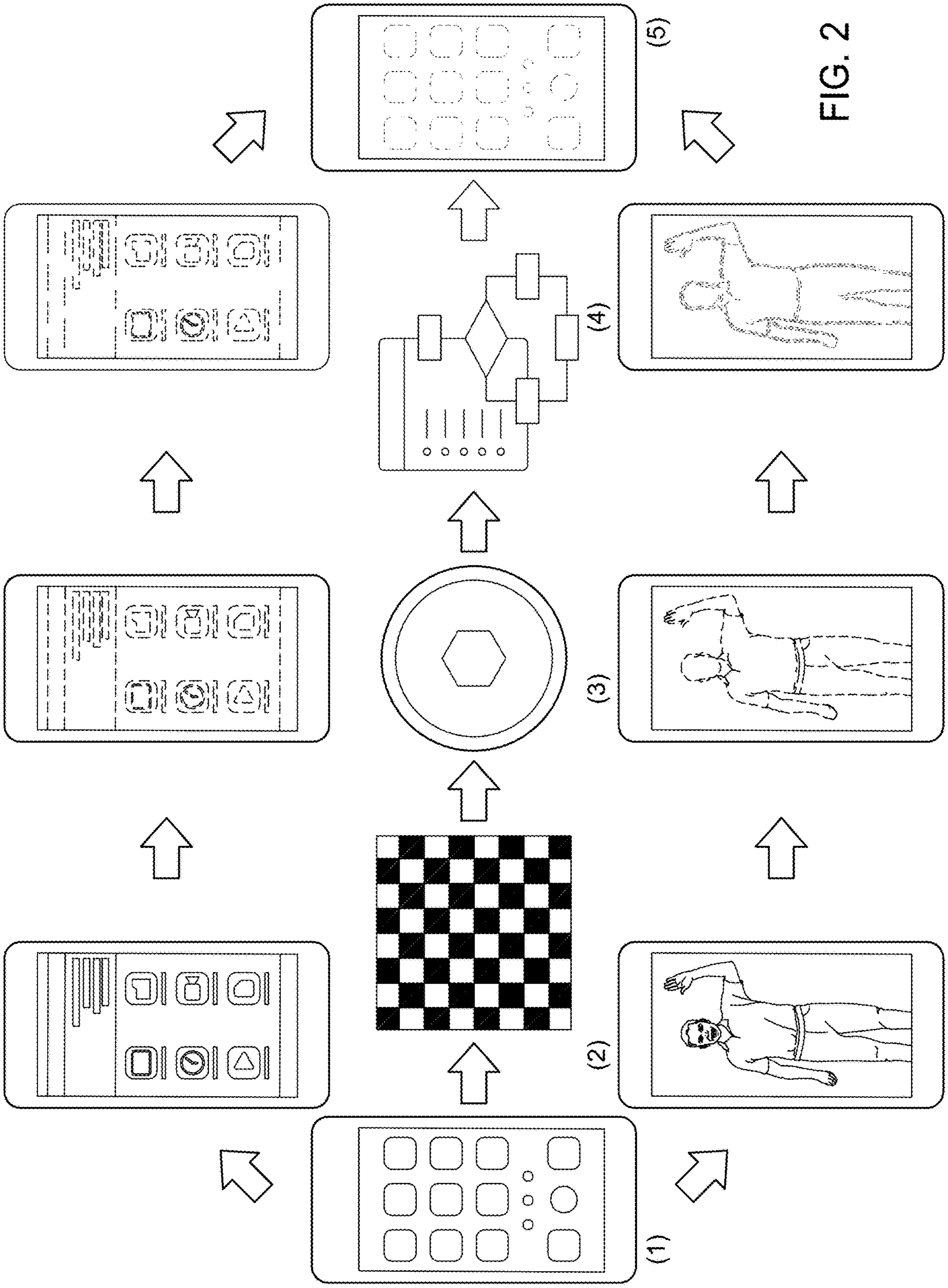

FIG. 2 provides an overview of a protection mechanism 10 for displaying an image of a display device. The main components for the protection mechanism are: 1) the original input image, 2) a checkered grid mask with the dimensions of the original image, and 3) a blurred or pixelated version of the original input image. A protected image for display is then computed as will be further described below.

For grid generation, the protection mechanism 10 is based on the observation that at angles smaller than 1.22λ/D, where λ is the wavelength of light, and D is the lens aperture, it is no longer possible to distinguish two light sources from one another. Thus, using a checkered grid of pixels results in the pixels appearing as one uniform color to a user viewing from a far distance; whereas, a user near the screen can distinguish between the individual pixels within the grid.

To enable the protection mechanism 10 to function on colored content of any type, the design makes the screen appear blurry (for text and mobile UIs) or pixelated (for images and videos) to users who perceive the pixels on the device screen from a small resolving power angular resolution (around 30-40" away from a smartphone or 20" with a 45° angle).

$$\text{rms} = \sqrt{\frac{x^2 + y^2}{2}} \text{ and } y = \sqrt{(\text{rms}^2 \cdot 2)} - x^2$$

It is observed that two colors arranged in a checkered grid pattern and displayed on a screen appear as their average (additive color). While the best perceptual approximation of this averaged color can be achieved using a color approximation model such as CIECAM02 or CIELAB, due to real-time computation constraints, the protection mechanism 10 implements color averaging as the root mean square as shown in Eq. (1) to reduce the required computation time. Using the target (blurred/pixelated) image pixels as rms and the original image pixels as x, Eq. (1) computes the protected output image pixels as y.

Figure 3:
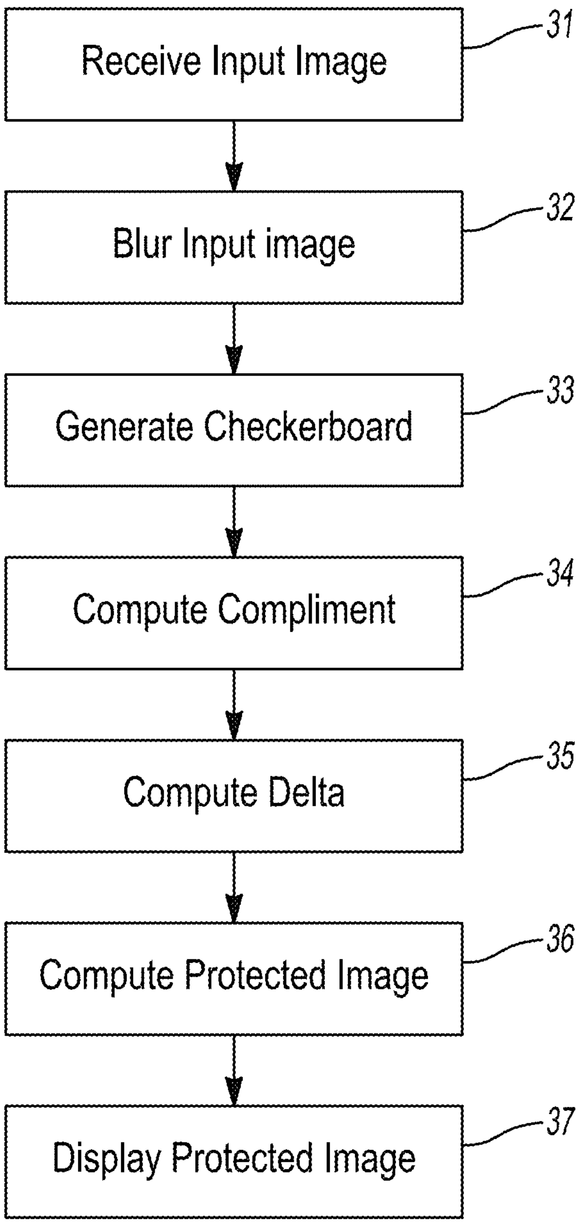
FIG. 3 is a flowchart depicting an example embodiment of the protection mechanism.

FIG. 3 further depicts an example embodiment of a method for displaying a protected image on a display device. As a starting point, an input image (img) to be displayed is received at 31 by a processor of the mobile device. The user of the device may also specify a protection setting which indicates the strength of the desired protection. While particular reference is made to mobile devices, such a smart phones and tablets, the techniques described herein are applicable to other types of displays and devices.

The input image is blurred or pixelated to create a target image (targ) as indicated at 32. In an example embodiment, the input image is blurred using a Gaussian function. In an implementation on a device running Android, image may be blurred using a 2-Pass Box Blur or a Kawase Blur to improve runtime and reduce GPU usage. In some embodiments, the contrast of the target image can be adjusted based on a protection setting specified by the device user. For example, the device user may specify a protection setting chosen from the group of full, strong, moderate or weak protection. The protection setting in turn correlates to contrast parameters as follows:

Full: σ=24, contrast=80/127

Strong: σ=20, contrast=100/127

Moderate: σ=16, contrast=115/127

Weak: σ=8, contrast=127/127 where σ refers to the standard deviation of the Gaussian blur filter. The Gaussian filter convolves over an image with a specific window size with a Gaussian distribution. This means that a larger σ value blurs/blends together a larger radius of pixels compared to a smaller σ value. This contrast parameter decreases the contrast of the output by computing:

$$\alpha = \text{float}\,(131^{*}(\text{contrast}+127))/(127^{*}(131-\text{contrast}))$$

$$\gamma = 127^{*}(1-\alpha)$$

$$\text{output\_img} = (img^{*}\alpha)+\gamma$$

This technique is merely exemplary and other techniques for blurring the input image also fall within the scope of this disclosure.

Next, a checkerboard pattern of ones and zeros is generated at 33, where the dimensions of the checkboard pattern have same dimensions (w×h) as the input image. The square size g in the checkerboard pattern has a direct effect on the range at which the user can effectively operate their device, and it also has an effect on the range that a shoulder surfer can obtain information from viewing the display. The grid square size is preferably based on three factors: (1) the distance from the user to the display; (2) the device's pixel density (pixels per square inch, ppi); and (3) the font size. In an example embodiment, the square size g is set to 1×1 for experiments performed on the iPhone 13 Pro which has a 2532×1170 resolution with 460 ppi display, the user viewing the device from 10", and the default application font size. The protection mechanism can adapt this to other configurations with different pixel densities or different text sizes by using this default g=1×1 for 460 ppi and medium font size. The optimal square size for a given grid can be calculated by scaling this proportionally to the target device's ppi and font size, and rounding to the nearest pixel. For example, square size can be computed by $$g = p^{*}2d^{*}\tan(\alpha/2)$$

where p is pixel density in pixels per inch, d is distance to display in inches, and a is human eye resolving power in degrees (i.e., 0.0167 degrees). Alpha is a constant which could be changed, for example to the resolving power of a camera.

With the checkerboard pattern and the target image, a protected image can now be computed. To do so, a complementary image is computed at 34 as $$\text{complement} = (targ^{2*}2) - img^{2}$$

where targ is the target image, and img is the input image. A delta image is then computed at 35 as $$\text{delta} = (\text{complement} - img^{2})^{*}\,\text{grid}$$

where grid is the checkboard pattern. The protected image is finally computed at 36 as $$newimg = \text{square root of } (img^{2} + \text{delta})$$

The protected image is displayed on the target display device. Pixel values of the protected image may be clipped to fall within the acceptable range of the display device (e.g., between 0 and 255). It is envisioned that the complement, delta and new image operations can be performed on the entire image or, alternatively, performed on regions of the image, where the image is divided into different regions each containing multiple pixels.

In some implementations, additional preprocessing steps may be performed to make the screen less visible to shoulder surfers. For example, the contrast of the image can be decreased. More specifically, the contrast is decreased according to:

$$\text{new\_pixel\_targ} = (\text{pixel\_targ} - 0.5)^{*}\text{contrast} + 0.5$$

and is applied to every pixel on the blurred target image/screen part of the algorithm. That is, the blurred image target also has decreased contrast according to the contrast parameter (a value between 0.0 to 1.0). When contrast=1.0, the pixel values are all gray (0.5).

Alternatively or additionally, the brightness of the image can be decreased while maintaining legibility according to:

$$\text{new\_pixel\_img} = \text{pixel\_img} - \text{brightness}$$

and is applied to every pixel on the original image/screen part of the algorithm. Brightness is once again a value between 0.0 and 1.0. When brightness=1.0, the pixel values are all black (0.0). These pre-processing steps would be applied to the input image before the step of blurring the input image.

Figure 4:
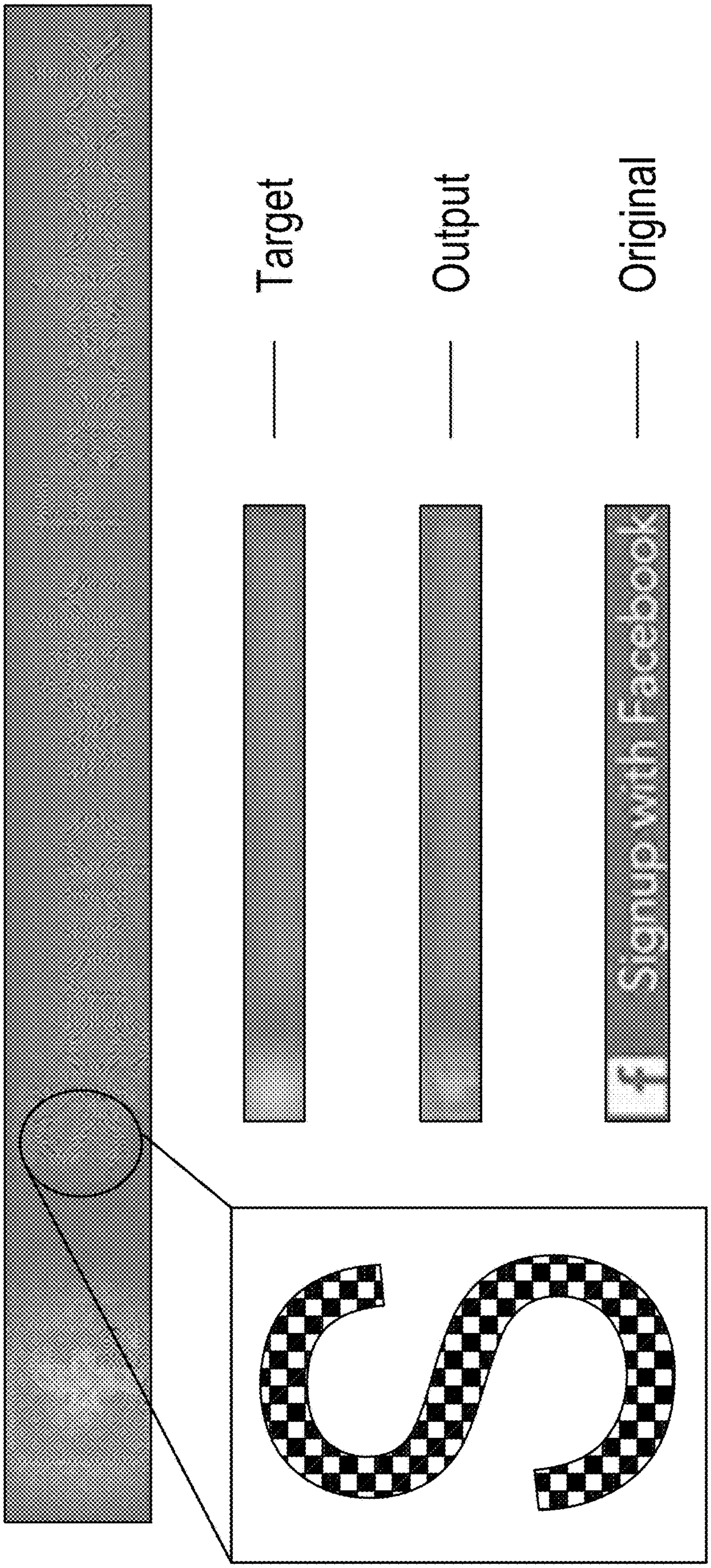
FIG. 4 is an illustration of a protected line of text.

FIG. 4 shows an example of the resulting protected screen content, where a full-size version of the protected content and downscaled versions of the target, protected output, and original text are presented. Note that the text output by the protection mechanism 10 is much harder to discern as compared to the original text. However, viewing the text in close proximity allows the user to still read the content.

The advantage of the protection mechanism 10 is its parallelization and scalability. This approach works with any range of colors and can parallelize the steps of blurring and grid generation. That is, the steps of blurring the input image and generating the checkerboard pattern can be performed concurrently. This approach also allows for much of the image processing (e.g., blurring and matrix operations) to be performed in parallel or on a GPU. The protection mechanism 10 performs operations on entire images at once using consumer-grade smartphones with GPUs.

Example implementations of the protection mechanism 10 utilize the mobile device's GPU on 4 platforms (Windows, Android, MacOS, iOS) to accelerate image processing and matrix operations. In the Windows implementation, a CPU-only version and a GPU version were created for performance comparisons. The desktop implementation also supports video processing and writing using FFMPEG. The full development stack of the protection mechanism 10 for each platform can be found in Table 1 in the appendix. As it is unrealistic to expect app developers to implement a shoulder surfing solution on their platforms, the protection mechanism 10 was devised as a proof-of-concept solution to be implemented on the operating systems. As such, the protection mechanism 10 acts more like a screen filter than an API for mobile app developers.

For PC, CUDA: on several workstations and servers with access to an Nvidia GPU and CUDA drivers, the protection mechanism 10 is able to run in real time using Python, OpenCV, and CUDA. The protection mechanism 10 leverages CUDA to perform image blurring, grid generation, and the matrix operations used to compute the average colors.

For Android, OpenGL: the protection mechanism 10 runs in real time on Android mobile devices using OpenGL's shaders and rendering. In this environment, the protection mechanism 10 is capable of achieving real-time performance in image blurring without using OpenCL drivers. Note that the implementation could improve with access to OpenCL drivers. The protection mechanism leverages OpenGL or Vulkan to perform the matrix operations used to compute the average colors. Here, the implementation of the grid generation is quick enough to be performed on the CPU in real time.

For MacOS, iOS, Metal: the protection mechanism 10 can run in real time on MacOS and iOS devices using Swift, CoreImage, and Metal. It leverages Metal to perform image blurring and the matrix operations used to compute the average colors. Grid generation is performed in C++ on the CPU. The proposed protection mechanism 10 is capable of protecting all information categories except for PIN entry, since keypad reshuffling is required to make PIN entry fully secure.

Next, the protection mechanism's 10 efficacy in protecting content, performance and resource consumption, and usability cost is evaluated empirically.

For perceptual similarity, protected images and video are generated using the protection mechanism 10 on three datasets: 1) RICO, an image dataset of mobile app UIs; DIV2K, a diverse dataset of high resolution (2K) images, and DAVIS, a video dataset for object segmentation. With the combined datasets, 3,882 unique images were evaluated. Using four different parameters for grid size and blurring/pixelation intensity, a total of 124,224 protected images were generated for use in experiments. To evaluate the information protection guaranteed by protecting images with the protection mechanism 10, the SSIM index (structural similarity) of the protected image and the blurred/pixelated target image are measured. SSIM extracts and compares the luminance, contrast, and structure between two images, where the formular is provided below.

$$SSIM(x, y) = \frac{(2\mu_x\mu_2, +c_1)(2\sigma_{xy} + c_2)}{(\mu_x^2 + \mu_y^2 + c_1)(\sigma_x^2 + \sigma_y^2 + c_2)}$$

where x, y are windows of size N×N, μ is the average, σ is the variance/covariance, and c are normalization constants. In these experiments, SSIM is used with x, y=7×7, and c1=0.01, c2=0.03. To simulate the distance from which a shoulder surfer views the protected image, downscale the protected image and compare the SSIM with the target (blurred/pixelated) image. Also, measure the SSIM of each full-scale protected image compared with the original image to evaluate the extent to which the protected image represents the original image.

To determine whether text and high-level details from images can be hidden from shoulder surfers using the protection mechanism 10 at a large-scale, one can leverage the Google Cloud Vision API to perform image recognition and optical character recognition (OCR). The "label detection" (image recognition) service provides labels and their associated confidence scores. Using OCR, one can also detect the boundaries of texts and extract their content from images of mobile UIs. The efficacy of the protection mechanism 10 is evaluated by performing label detection on downscaled protected images/videos from the DIV2K and DAVIS datasets and performing OCR on the mobile app UI screenshots from the RICO dataset. These results are compared with the API outputs of the unprotected downscaled images to provide a baseline for the percentage of labels and text protected.

To determine whether the protection mechanism 10 can run in real time, the processing time and memory consumption are benchmarked on various devices, both with and without leveraging the devices' GPUs. A wide range of image resolutions were tested—as small as 256×144 and as large as 3088×1440. These encompass commonly used video resolutions, mobile screen resolutions, and an image size for direct performance comparisons with other techniques, such as HIDESCREEN. The overall processing time of the protection mechanism is derived from a combination of the grid generation, blurring/pixelation of the original image, and the screen hiding algorithm that computes complementary colors. The performance data is gathered by logging processing times after running the protection mechanism for 100 image frames. The resource overhead of the protection mechanism 10 is also evaluated by recording the maximum CPU utilization and the maximum memory usage after running the protection mechanism over the stream of 100 images. Finally, measure energy consumption by using the Android Studio energy profiler and the Xcode energy impact gauge. These energy impacts are estimated based on GPU and CPU utilization, network and sensor usage, as well as other costs/overheads. The performance evaluations were run on four devices: a workstation with an AMD Ryzen 9 3900X CPU and an Nvidia GTX 2080 Super GPU, a 2021 MacBook Air with an M1 chip, a Samsung Galaxy S20 Ultra, and an iPhone 13 Pro. See Table 8 for more details.

Additionally, a user study was conducted through an Amazon Mechanical Turk (MTurk) survey to assess the protection strength of the protection mechanism 10 on a diverse set of images and videos. 99 U.S. participants, aged 23-71 (M=43.19, SD=10.37; 55% men, 44% women), completed a survey. The user study protocol was exempted (and approved) by the institution IRB, and participants who completed the study received $1.75 as compensation. A series of questions were developed where participants are presented with the original images/videos and the images/videos protected by the protection mechanism 10 (in random order). To mitigate bias, participants were shown the protected images from the shoulder surfer's perspective, followed by the protected images from the intended user's perspective, and finishing with the unprotected images from the shoulder surfer's perspective. Participants are asked several text entry questions regarding the content within each image. To represent the distance at which a shoulder surfer sees the content, a (4×) downscaled version of both the original and protected content was also presented.

To derive the 4× downscaling, calculate the angular diameter of an 5.78" iPhone 13 Pro (the device used in an in-person user study) at 2 distances, 10" and 41" (10"+31", the average airplane seat pitch). Obtain an angular diameter of 8.064° and 32.239°, or roughly a 4× perceived size difference.

Responses were collected from participants perceiving the protected and unprotected screens from the perspectives of the shoulder surfer and the intended user. A total of 20 unique images, 6 unique videos, and 20 unique mobile app UIs were presented to participants. These images and videos were randomly sampled from the evaluation datasets. Each participant answered questions regarding a random subset of 8 unique images/videos, portrayed as the downscaled protected screen, the full-size protected screen, and the downscaled original screen (24 images/videos per participant). The survey averaged around 12.62 minutes for completion. With 99 participants, each question received an average of 19.8 responses, for a grand total of 3,180 responses. A shoulder surfer or intended user's recognition rate (binary accuracy, Rss, Riu), or the percentage of text, images, and videos correctly labeled by the MTurk participants were measured. In addition to evaluating the efficacy of the protection mechanism 10, we also obtain user perceptions towards shoulder surfing and the users' inclination to use the protected screens. These responses were obtained using 5-point Likert survey responses ranging from "Strongly Disagree" to "Strongly Agree", normalized to values between 0-4. Finally, the response time for each question was recorded to better understand how the protection mechanism 10 impacts the comprehension time of protected images.

An additional in-person user study was conducted to assess the usability and protection strength of the protection mechanism 10 on a diverse set of images and videos. 22 U.S. participants, aged 22-63 (M=36.32, SD=13.15; 41% men, 59% women), completed the user study. Participants were recruited with varying degrees of smartphone experience and visual health. The user study was conducted in a brightly lit lab with the device brightness at a moderate setting. The participants' vision was unobstructed by glare before continuing further in the study. Prior to conducting the user study, the device (iPhone 13 Pro) displaying the images and videos protected with the protection mechanism 10 was placed on a smartphone mount on a table. The screen brightness of the device was set to 66%. Participants were instructed not to move or alter the device. This was done to ensure consistency between the evaluated study settings and to avoid the additional confounding factors that would arise if participants held the device. They were asked to evaluate the presented screen in 5 different settings: 1) a shoulder surfer 41" away from the screen protected by the protection mechanism, 2) an intended user 10" away from the screen, 3) a shoulder surfer 20" away from the protected screen at a 45° angle, 4) a shoulder surfer 41" away from the unprotected screen, and 5) a shoulder surfer 20" away from the unprotected screen at a 45° angle. This order was selected to mitigate bias from previous tasks. Participants were also asked to evaluate a screen protected by a privacy film compared to a screen protected by both the protection mechanism 10 and a privacy film by asking them to lean towards the device in setting 3 until they were able to read the content displayed on the device screen. Setting 3, setting 5, and the evaluation with the physical privacy film were changes made to the original user study after suggestions from reviewers. This expanded user study along with the qualitative interview was conducted with 15 out of the 22 total participants. The total study took around 1 hour to complete with $20 for compensation. A series of questions were developed where participants are presented with the original image/video and the image/video protected by EYE-SHIELD (in random order). A total of 6 images, 2 videos, 7 mobile app UIs, and 2 screen recordings were presented to participants. Participants were asked several questions regarding the content within each image, involving reading text, describing images, and explaining videos. Some examples of these tasks were questions like "What is the current card balance?", "Can you read the first word in each sentence?", and "Can you describe the displayed image?". For texts, partial correctness was included in the accuracy metric. Although the correctness of the descriptions was subjective, most participants' answers were binary: accurate/specific (e.g., "ice rock climbing" and "person in red hiking mountain"), or no comprehension. A shoulder surfer's or intended user's recognition rate (binary accuracy) was measured as the percentage of text, images, and videos correctly labeled by the participants. Participants were also asked to indicate the percentage of text they could read. The participants were asked to complete a system usability scale (SUS) survey regarding the quality of images and text from the intended user's perspective.

Finally, various topics related to the protection mechanism 10 were discussed and received a variety of qualitative feedback. Qualitative feedback was obtained after the user study experiments and the usability questionnaires were completed. The interview was open-ended and casual to learn about participants' initial perceptions of the system. To help guide and continue the discussion, participants were asked about several topics.

For Experiment 1: How effective is this approach at protecting content such as colored images, videos, text, and mobile UIs? In the experimentation with perceptual similarity metrics, the protection mechanism 10 acts as expected, by very closely (SSIM>0.9) resembling the blurred/pixelated content at smaller sizes and the original content at the original size. Cloud-based OCR and image recognition models are only able to recognize 8.45% of images and 3.16% of texts protected by the protection mechanism.

Through user study tests, both in-person and crowdsourced, one finds shoulder surfers are only able to recognize 25.00% of images and 18.78% of text. The crowdsourced study indicates that shoulder surfers can only recognize 32.24%-35.50% of the content within images, videos, and texts. Thus, the experiments indicate the protection mechanism provides additional protection beyond using solely a privacy film.

For Experiment 2: Does the protection mechanism meet real-time constraints for its screen hiding algorithms? The protection mechanism is capable of achieving smooth performance (43 FPS) at even the highest screen resolutions (3088×1440). At lower resolutions, the protection mechanism can achieve 60+ FPS, the optimal performance for screens with a 60 Hz refresh rate. While running, the protection mechanism consumes an acceptable amount of memory and CPU while having a moderate impact on power consumption.

For Experiment 3: Is the usability cost of applying the protection mechanism to users' smartphones acceptable? Users who are bothered and uncomfortable with shoulder surfing are more likely to use the protection mechanism, with users on average reacting positively towards the quality of text and images. The usability of the system was deemed above average, with a SUS score of 68.86. The interviews with 15 participants provide additional insights into the usability of the protection mechanism, discussing concerns related to eyestrain, activation, and use cases.

Figure 6A:
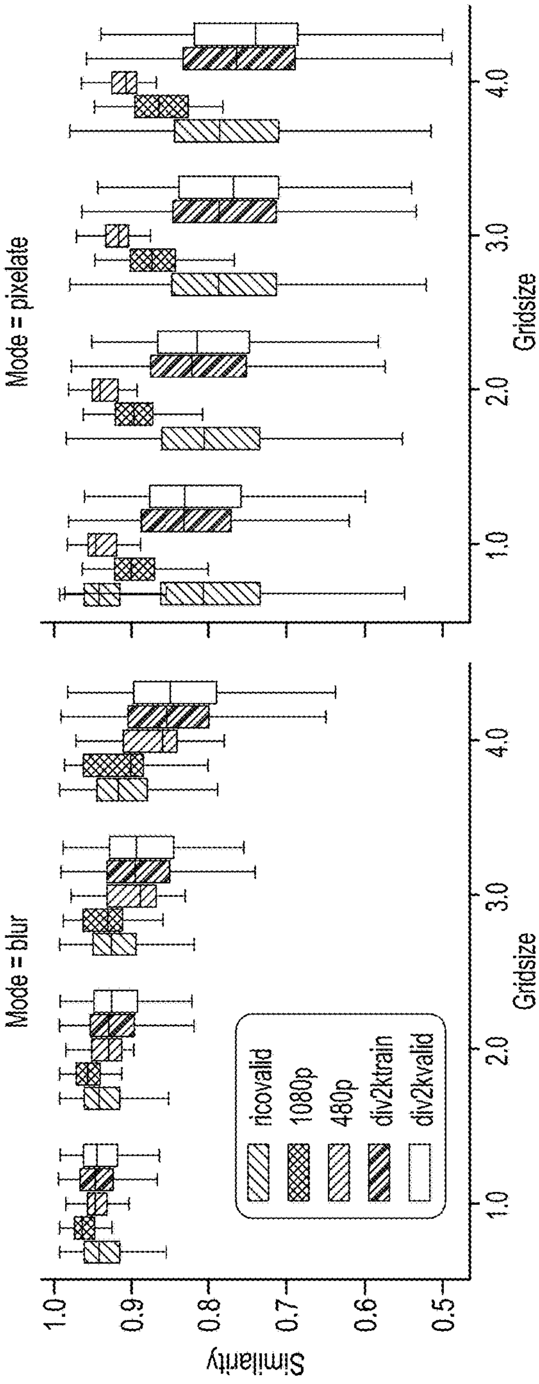
FIGS. 6A-6C are graphs showing SSIM scores for each of the three evaluated datasets while varying grid size, downscaling sizes and blurring intensities, respectively.
Figure 6B:
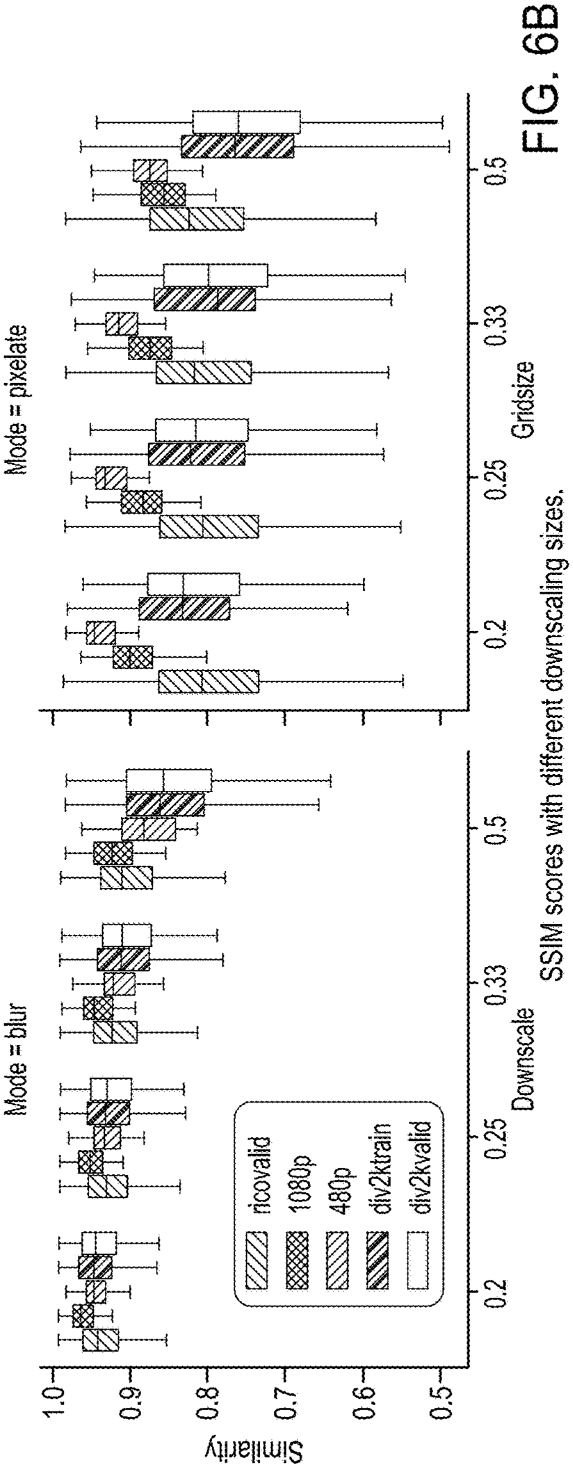
Figure 6C:
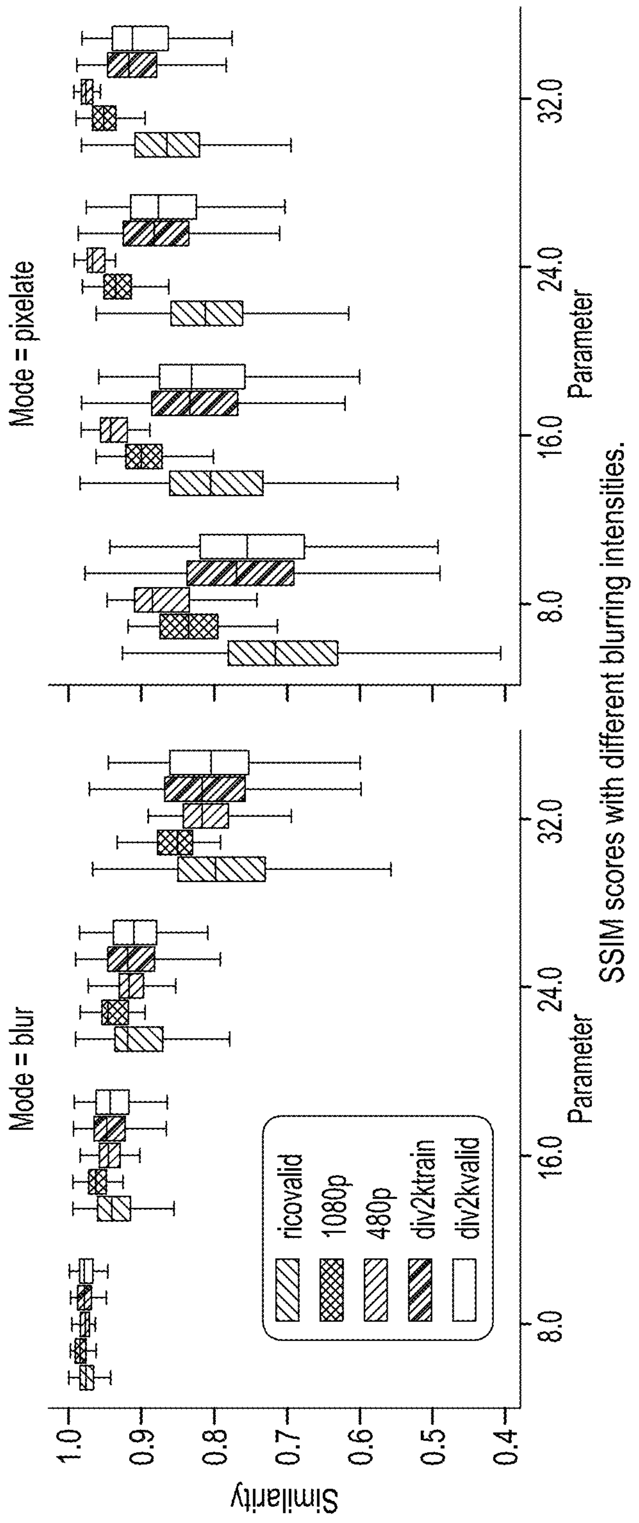
Figure 7A:
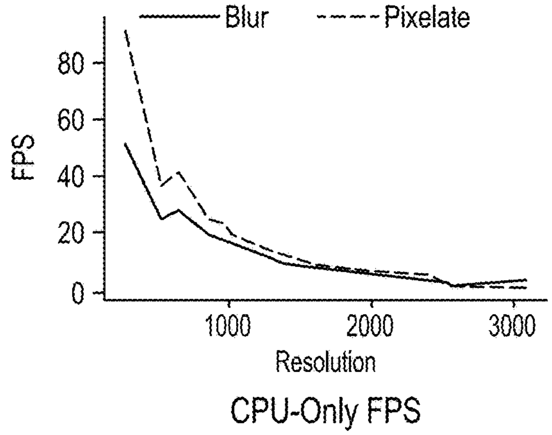
FIGS. 7A and 7B are graphs showing measured FPS with CPU-only and with GPU implementations, respectively.
Figure 7B:
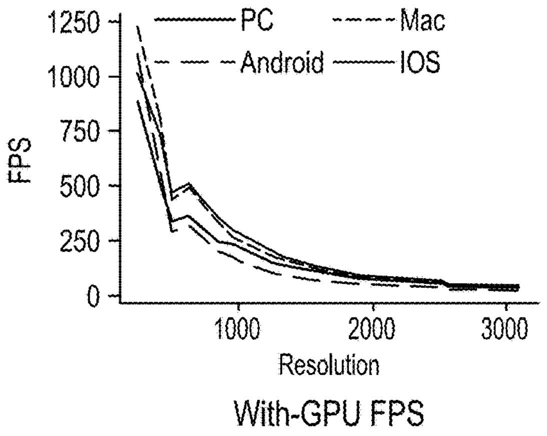
Figure 8A:
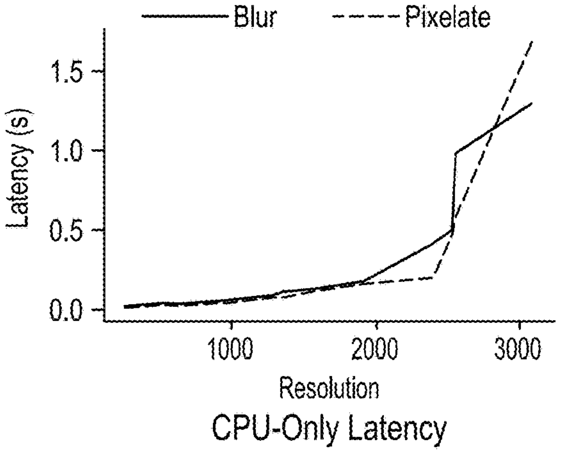
FIGS. 8A and 8B are graphs showing measured latency with CPU-only and with GPU implementations, respectively.
Figure 8B:
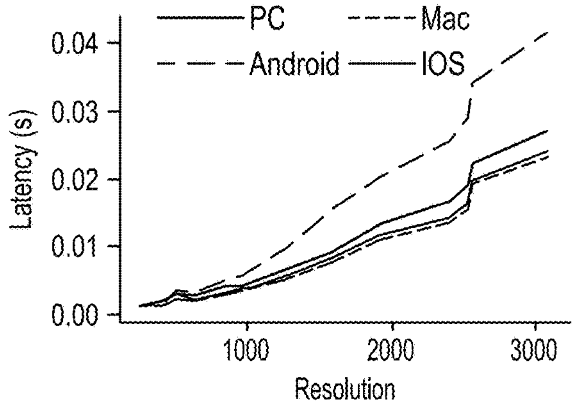

FIG. 6A-6C show the measured SSIM scores, where scores near 1.0 indicate high structural similarity, and scores near 0.0 indicate low similarity. Several parameters, such as grid size, downscaling size, and the window size for blurring were tested. These 4× area downscaled images are consistent with the images presented to the MTurk participants. The algorithm was found to closely mimic the blurred images with blurring intensity of up to $\sigma$=24, with the performance starting to degrade at $\sigma$=32 (FIG. 6C). SSIM scores are >0.9, demonstrating the high efficacy of the protection mechanism 10. Likewise, the structural similarity using pixelation degrades when the number of pixelated blocks is <16. The results in FIG. 6B also suggest that the protection mechanism can provide some protection even at distances of only 20", though distances of 30" and beyond afford the best protection guarantees. Finally, while the smallest grid size achieves the best performance, larger grid sizes are more effective at hiding larger text fonts.

Figure 5A:
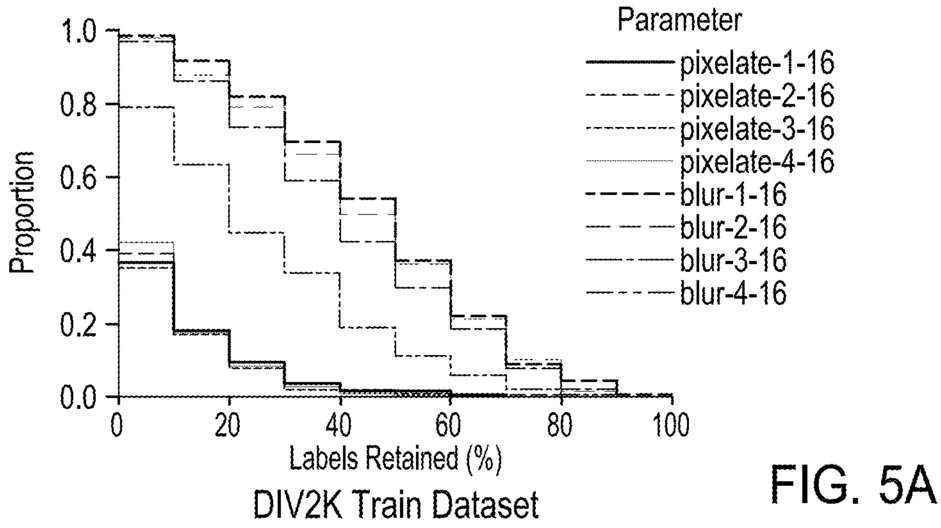
FIGS. 5A-5C are graphs showing results of using Google Cloud Vision API on protected images from three datasets, respectively.
Figure 5B:
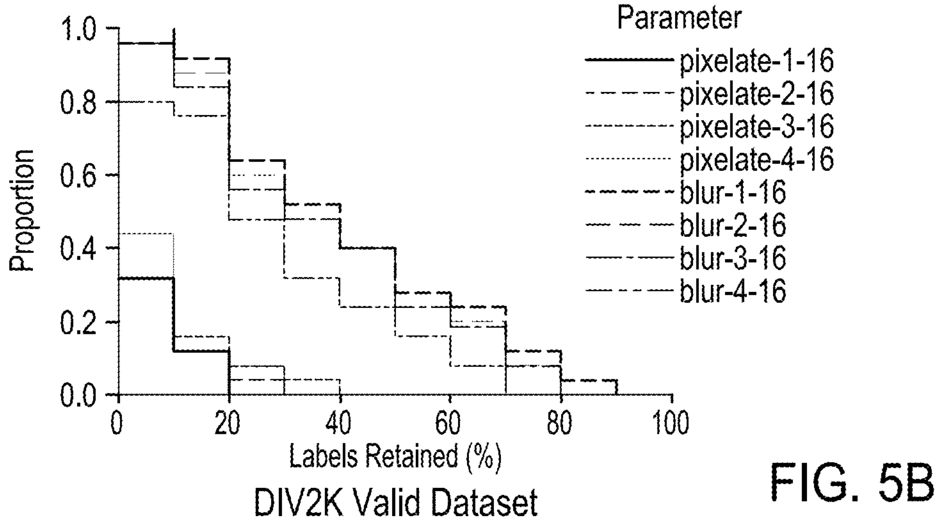
Figure 5C:
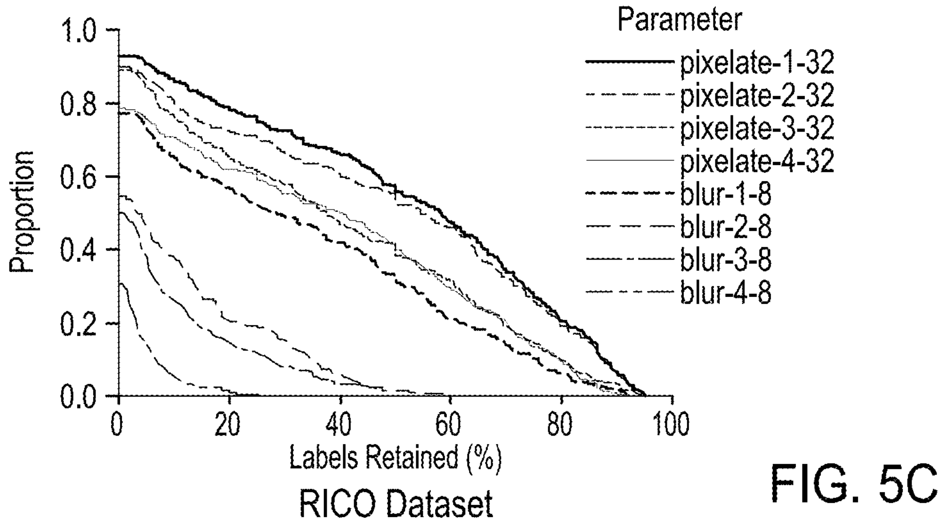

The protection mechanism 10 is capable of reducing the detection rate of both image recognition and OCR systems. From an evaluation using the Google Cloud Vision API, FIG. 5A-5C show how a majority of the protected images retain fewer than 50% of the detected content compared to the original images. With certain parameters, around 20% of the evaluated images retain 0% of the originally detected labels. This observation holds for each evaluated dataset. In total, the DIV2K Valid, DIV2K Train, and RICO datasets protected by the protection mechanism retain 22.93%, 24.60%, and 47.71% of the original labels and text across all parameters. The high-resolution images protected using pixelation preserve much more information than the images protected using blurring. For images of mobile app UIs, blurring degrades the performance of the OCR system more than pixelation. When using blurring for text and pixelation for images, protected images retain 8.45%, 9.48%, and 42.38% for the DIV2K Valid, DIV2K Train, and RICO datasets, respectively. At larger grid sizes, the original text retained by the protected images decreases to as small as 3.16%. These results indicate that the protection mechanism may function best when switching between blurring and pixelation, depending on the type of interface presented on the device's screen. Selecting between blurring and pixelation can be made possible by detecting the amount of text on-screen using features such as OCR or using a phone's accessibility suite to determine the quantity of on-screen text. These results suggest that both shoulder surfers and vision systems may struggle with recognizing the information on a screen protected with the protection mechanism.

As the protection mechanism 10 was designed to protect mobile device screens with real-time constraints in mind, a set of performance evaluations was conducted aimed at measuring the protection mechanism's performance on a variety of screen sizes, video resolutions, and image sizes. With reference to FIGS. 7A-7B and FIGS. 8A-8B, the processing time for the protection mechanism with GPU support achieves 36.72 FPS, 75.27 FPS, and 241.72 FPS for resolution sizes of 3088×1440, 1920×1080, and 854×480. At an average latency of 3.457 ms on 512×512 full-color images, the Android implementation of the protection mechanism 10 provides a 487× speed-up compared to the 1684 ms achieved on HIDESCREEN with 512×512 gray-scale images. The iOS, MacOS, and PC implementations of the protection mechanism achieve 2.153 ms, 2.317 ms, and 2.986 ms, respectively. The average latency of running the protection mechanism 10 on an image or frame of 3088×1440 is 27.23 ms (PC), 41.75 ms (Android), 24.10 ms (MacOS), and 23.23 ms (iOS). As shown, the protection mechanism 10 can achieve an average of 43 FPS on 3088×1440 screen resolutions using the iOS implementation. This performance would allow the screen protected by the protection mechanism 10 to update according to the user's inputs at an effective refresh rate of 43 Hz. Considering most smartphones run at a 60 Hz refresh rate, this implementation provides an acceptable trade-off for increased privacy. Alternatively, users who prefer responsiveness to high resolution may display the protected screen at a lower resolution to attain >60 FPS. The evaluation shows that the protection mechanism achieves a >60 FPS at screen resolutions of 1170×2532 and smaller on iOS (Table 2). The trade-offs between latency and screen resolution are similarly present in energy consumption and memory usage. In the case where most users prefer stable performance over higher screen resolution, the protection mechanism will prioritize selecting a screen resolution that can match the device's refresh rate.

Figure 9A:
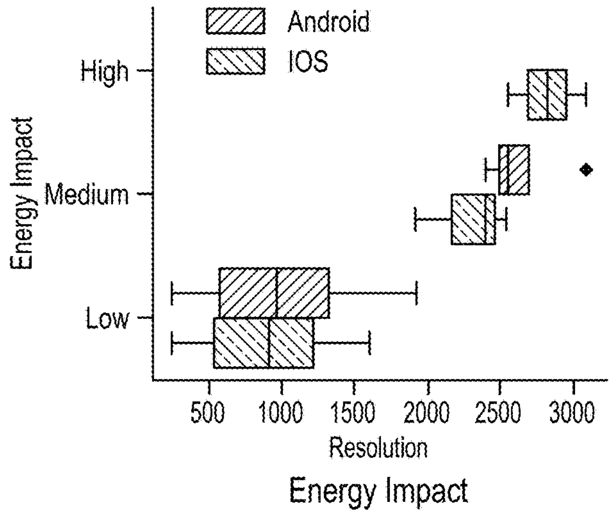
FIGS. 9A-9C are graphs showing energy usage, CPU utilization and memory usage, for different devices, respectively.
Figure 9B:
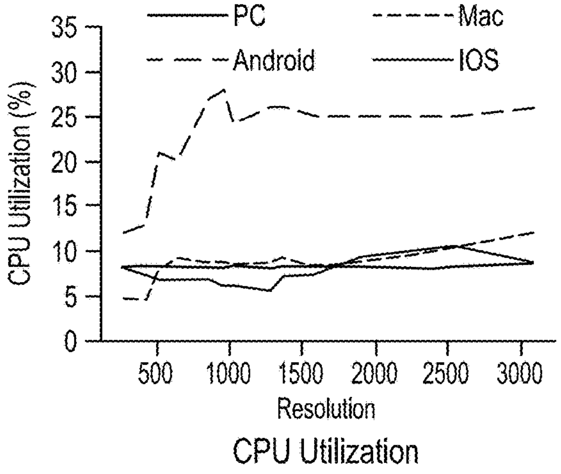
Figure 9C:
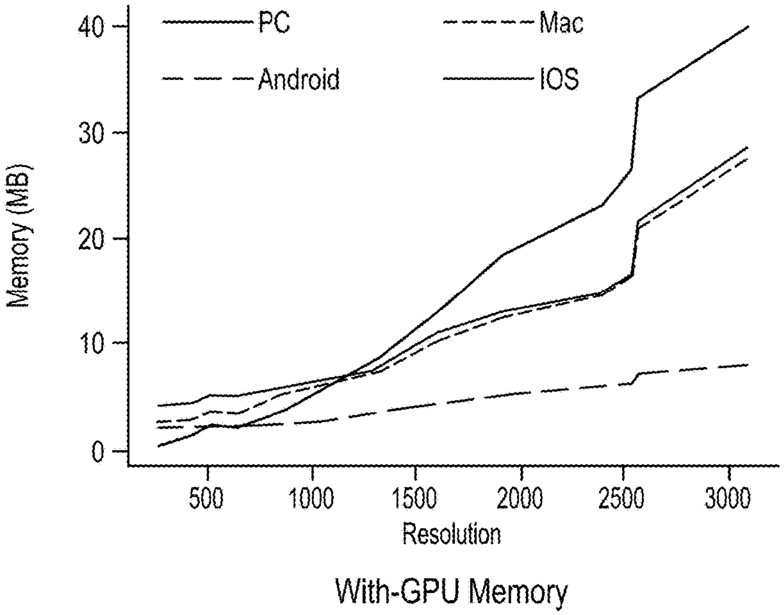

Since the protection mechanism 10 must be lightweight enough to run on mobile devices, the memory usage is small enough to not cause significant memory errors or stuttering. FIG. 9C shows the memory usage of with-GPU and non-GPU implementations of the protection mechanism across each platform. The memory usage scales with the resolution size, reaching up to 40.04 MB per frame in the GPU implementation of the protection mechanism 10. Using only the CPU consumes more memory with each frame (up to 299.95 MB).

On mobile devices, the protection mechanism 10 is observed to achieve low energy consumption for resolution sizes of up to 1920×1080. For larger resolution screen sizes, the measured energy impact is medium to high as seen in FIG. 9A. The maximum measured CPU utilization of the protection mechanism for each of the four evaluated devices is shown in FIG. 9B. Utilization is a percentage of all cores on the device. For the most part, utilization of all the CPU cores on the device remains below 25%. Overall, especially at lower resolutions, the measured resource usage and estimated energy impacts indicate that the protection mechanism is lightweight enough to be run on mobile devices without over-taxing battery life or causing overheating/thermal issues.

The main purpose of a MTurk study is a large-scale evaluation of the protection mechanism's efficacy in defending against shoulder surfing. The study demonstrates that shoulder surfers can only recognize as low as 32.24% of the text on the protected images from an effective distance of 41". As a comparison, shoulder surfers can recognize up to 83.84% of the unprotected text from the same distance. This degrades the shoulder surfers' recognition rate by 51.60 percentage points. The results for images and videos achieve similar protection improvements, with decreases in recognition rate of 60.75 and 61.61 percentage points, respectively. These reductions in recognition rate demonstrate the protection mechanism's potential for reducing the amount of information a shoulder surfer can glean from an unwitting user.

Figure 10A:
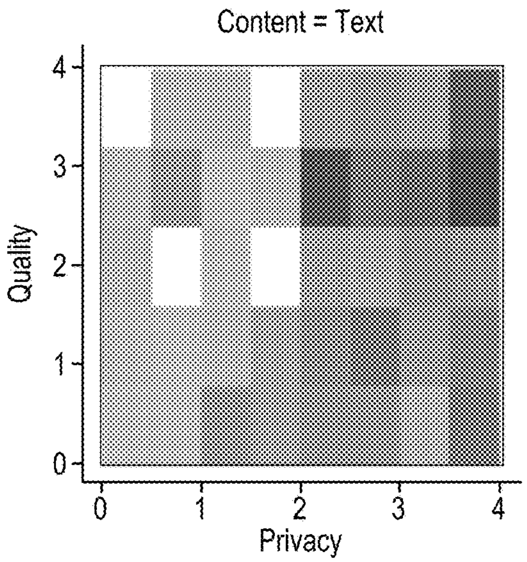
FIGS. 10A-10C are graphs showing likelihood of using the protection mechanism for text, images and video, respectively.
Figure 10B:
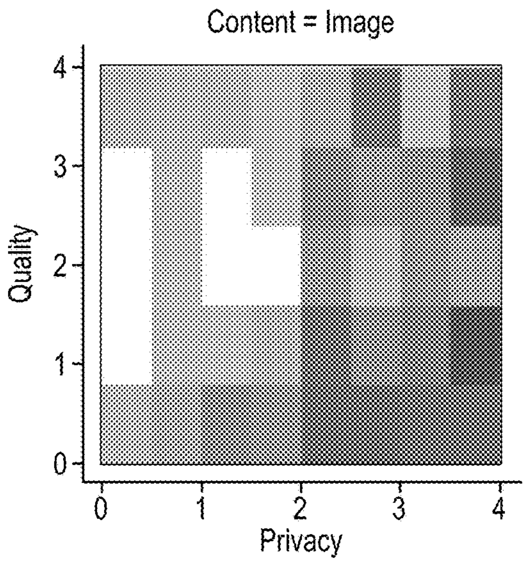
Figure 10C:
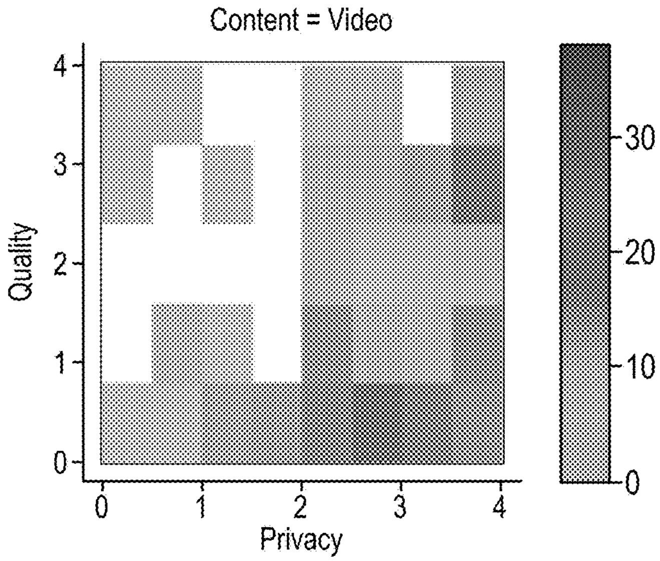
Figure 10D:
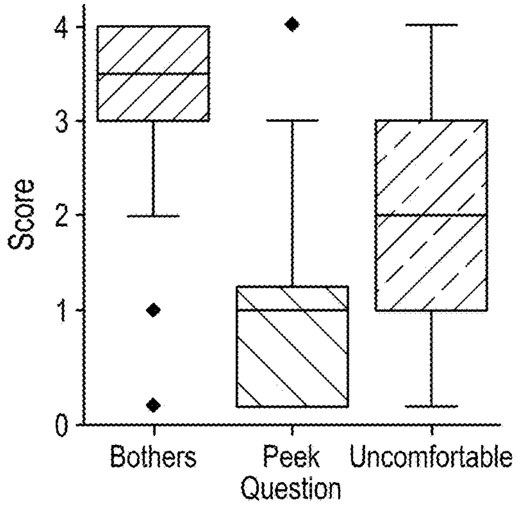
FIG. 10D is a graph showing privacy attitudes of participants.

Participants' perceptions of shoulder surfing was also assessed. The mean 5-point Likert scores for 1) how bothered users were by others peeking at their phones, 2) how often users peeked at others' phone screens in public, and 3) how uncomfortable users were with looking at their phones in public areas were 3.28, 1.02, and 1.83, respectively. FIG. 10D shows that the participants were generally averse to being involved in shoulder surfing both as the victim and adversary.

Participants' feedback was gathered on their contentedness of the quality of images using the protection mechanism 10 for different content types conditioned on their attitudes towards shoulder surfing. For those who were both bothered by shoulder surfing and uncomfortable with using their smartphones in public settings, the mean Likert score for the likelihood of using the screen protection in public settings was 2.61, 2.21, and 2.00 for mobile UIs, images, and videos, respectively. These indicate that, on average, privacy-conscious participants were mostly happy with using the protection mechanism in public settings to protect their privacy. FIG. 10A depicts how, especially for images of mobile app UIs protected using blurring, participants were happy with the quality of images. The density plots indicate a correlation between concern with shoulder surfing and the likelihood of using the protection mechanism. Participants were less satisfied with the image quality for the high-resolution images and videos protected using pixelation.

The recognition rate of screens protected by the protection mechanism 10 were assessed for an in-person setting and observed an overall recognition rate of 26.94% for shoulder surfers. For users close to the screen as the intended user, the recognition rate is 89.57%. For text visibility, stronger protection was observed with a shoulder surfer recognition rate of around 5.88%. Close to the screen, almost 100% of the text is visible to the intended user. Table 3 shows how in-person participants were only able to recognize 15.91% of the protected texts and 24.24% of the protected images. The video domain represented a much more challenging problem, as participants were still able to recognize the scenes 47.04% of the time. As a comparison, without the protection mechanism, participants could clearly see and recognize almost 80% of the texts and 100% of the images and videos.

Figure 11:
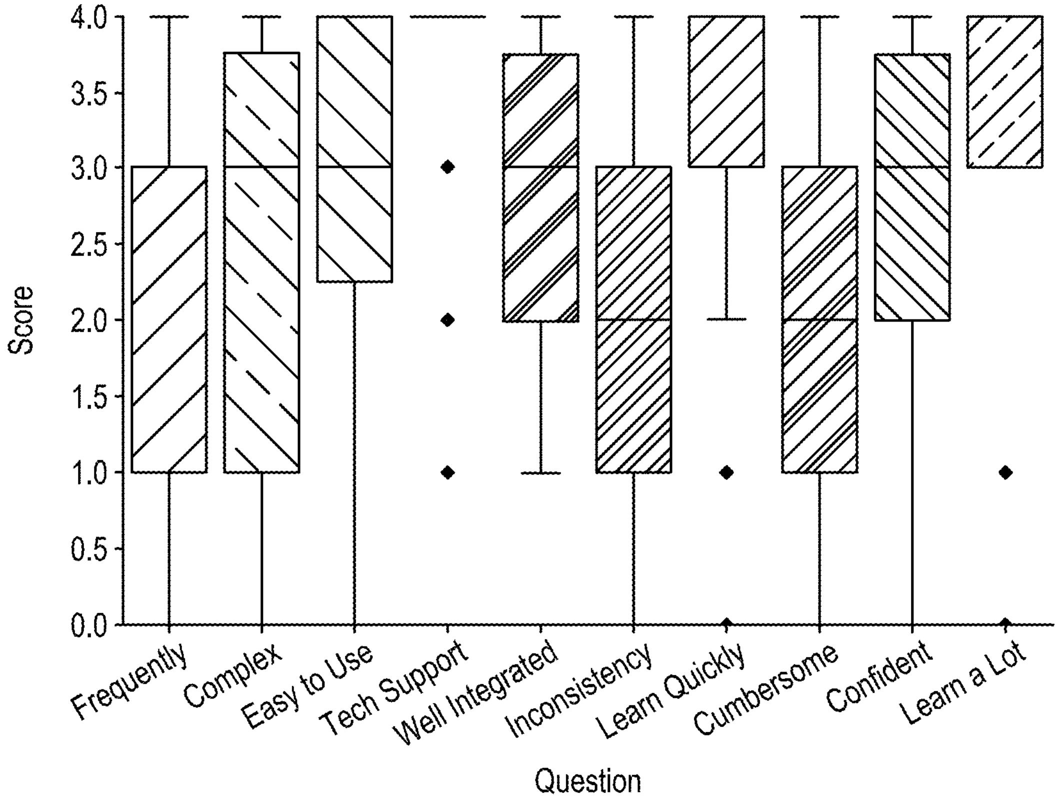
FIG. 11 is a graph showing normalized SUS scores for each question.

After answering questions about the content displayed, the participants responded to a questionnaire. See, Table 4. The average SUS score of the protection mechanism was 68.86, where a SUS score above 68 is deemed above average. The distribution of responses is presented in FIG. 11. These SUS scores include the original 7 participants along with the 15 new participants after the study design changed. Participants responded negatively mainly to the consistency and cumbersomeness of the protection mechanism 10, due to certain types of content being more easily recognizable than others.

Overall, out of 15 participants, 8 participants indicated they would be uncomfortable with shoulder surfers peeking at their devices (Q7), 7 participants indicated they preferred using the protection mechanism 10 overusing a privacy film (Q2), 7 participants found an option to set the blurring intensity to be useful (Q11), and 6 participants stated that the ability to toggle the protection mechanism 10 would be helpful. (Q11) 7 participants stated they would use the protection mechanism 10 for protecting financial data and PIN entry (Q3), and 3 participants said they would use it to protect personal texts and photos (Q4). 7 participants found the blurring that the protection mechanism 10 introduces to the user to be slightly annoying (Q5), and only 3 participants stated they had eyestrain as the intended user (Q6). Overall, these results support the claim that the protection mechanism would be helpful for protecting privacy-conscious users who are concerned about shoulder surfing.

Generally, participants wanted the protection mechanism 10 for PIN entry, and some participants wanted the protection mechanism to activate automatically for certain apps with more sensitive information (Q11). Participants also indicated that zooming, leaning in, and increasing brightness improved the usability of the protection mechanism as the intended user (Q13). It was also observed generational differences in the responses, for example, older participants generally used their phone less than younger participants in public and found less of a need for the protection mechanism.

Some participants were excited and wanted to see the protection mechanism 10 implemented on their smartphones, while others did not see themselves ever personally using the protection mechanism. Overall, participants reacted positively towards the protection mechanism, noting that it was very difficult to see the protected on-screen information from the perspective of a shoulder surfer.

The experimental evaluation indicates the feasibility of implementing a software-based privacy film for mobile device screens. Having a widely accessible low-latency screen protection mechanism could increase users' awareness of shoulder surfing attacks and preserve their privacy without significantly disrupting their device usage. Without the need for additional physical components, the protection mechanism 10 could be implemented agnostic of both apps and devices. Privacy-conscious users would no longer need to purchase and install new films whenever they change mobile devices, averaging once every 22.7 months for American adults (and more frequently for younger users). Highly cautious users will find increased privacy guarantees by applying both the protection mechanism 10 and a privacy film to protect their on-screen information.

In one implementation, a low-fidelity prototype was developed for toggling the protection mechanism on both the iOS and Android operating systems. The protection mechanism would be most naturally implemented as a toggle-able widget, with more advanced users being able to adjust individual parameters and features in the device's system settings and preferences. Users can manually toggle the protection mechanism upon entering public settings. Most users are expected to activate the protection mechanism before viewing private or sensitive content. For most users, the default parameters can be set to gridsize=1 and blurring with $\sigma$=8, which achieves the best overall performance. The default screen resolution size can be set to the maximum size in which the system achieves 60 FPS. Some users may opt to adjust these parameters to attain higher screen resolution or increased protection guarantees.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

APPENDIX

TABLE 1 development stack for different platforms

| Platform | Language | Image Processing | GPGPU |
|---|---|---|---|
| Windows PC | Python | OpenCV | CUDA 11.6 (CuPy) |
| MacOS Laptop | Swift | CoreImage | Metal |
| Android Smartphone | C++ | OpenCV | Vulkan (Kompute) |
| iOS Smartphone | Swift | CoreImage | Metal |

TABLE 2 mobile performance of the protection mechanism on larger screen resolutions

| Resolution | Android (FPS) | iOS (FPS) |
|---|---|---|
| 1920 × 1080 | 49.25 | 91.39 |
| 1080 × 2400 | 39.20 | 74.29 |
| 1170 × 2532 | 34.52 | 64.95 |
| 2560 × 1440 | 29.27 | 51.95 |
| 1440 × 3088 | 23.95 | 43.05 |

TABLE 3

MTurk and in = person content recognition rates

| Platform | Setting | Text (%) | Image (%) | Video (%) |
|---|---|---|---|---|
| MTurk | Intended User (Protected) | 97.22 | 81.75 | 79.80 |
| | Shoulder Surfer (Original) | 83.84 | 96.25 | 96.46 |
| | Shoulder Surfer (Protected) | 32.24 | 35.50 | 34.85 |
| In-Person | Intended User (Protected) | 98.05 | 82.58 | 86.64 |
| | Shoulder Surfer (Original) | 77.27 | 100.0 | 100.0 |
| | Shoulder Surfer (Protected) | 15.91 | 24.24 | 47.04 |
| | Shoulder Surfer (Original, 45°) | 100.0 | 100.0 | 100.0 |
| | Shoulder Surfer (Protected, 45°) | 21.90 | 22.22 | 51.67 |

TABLE 4

| interview questions | | |
|---|---|---|
| Code | Question | Count/Responses |
| Q1 | Does previous familiarity with a particular app UI help with your use of Eye-Shield? | 3 |
| Q2 | Would you prefer using Eye-Shield over using a physical privacy film? | 7 |
| Q3 | Would you use Eye-Shield to protect financial app information or PIN entry? | 7 |
| Q4 | Would you use Eye-Shield to protect your text messages or photos? | 3 |
| Q5 | Did you find the blurring that Eye-Shield causes annoying as the intended user? | 7 |
| Q6 | Did you experience any eye strain when using Eye-Shield as the intended user? | 3 |
| Q7 | Would you feel uncomfortable if you saw someone shoulder surfing your device? | 8 |
| Q8 | Have you experienced shoulder surfing before as the shoulder surfer or the victim? | 13 |
| Q9 | Do you prefer blurring over pixelation as the intended user? | 3 |
| Q10 | In what cases would you see yourself using Eye-Shield? | Time sensitive tasks, public transport, family snooping, lecture, church |
| Q11 | What method would you prefer Eye-Shield to be activated with? | Widget in control center, blurring/brightness meter, automatic activation |
| Q12 | What protection methods have you used to protect yourself from shoulder surfing? | Cover phone, lower brightness, stop usage, privacy film, Face ID |
| Q13 | What methods did you find improved the usability as the intended user? | Zooming in, increasing brightness, leaning in |
| Q14 | Various useful comments the participants brought up. | Difficulty with trifocals, accesability for languages, pixelation eyestrain, PIN-entry default, older people less usage, annoyance for reading quickly |

What is claimed is:

1. A computer-implemented method for displaying an image on a display device, comprising:

receiving, by a computer processor, an input image to be displayed on a display device;

blurring, by the computer processor, the input image to create a target image;

computing, by the computer processor, a complementary image as follows $$\text{complement} = (targ^{2*}2) - img^2$$

where targ is the target image, img is the input image and complement is the complementary image;

generating a checkerboard pattern having dimensions same as the input image;

computing, by the computer processor, a delta image as follows $$\text{delta} = (\text{complement} - img^2)^* \text{grid}$$

wherein grid is the checkerboard pattern and delta is the delta image;

computing, by the computer processor, a protected image as follows $$newimg = \text{square root of } (img^2 + \text{delta})$$

wherein newimg is the protected image; and displaying by the computer processor, the protected image on the display device.

2. The method of claim 1 further comprises decreasing contrast of the input image and thereby increase privacy protection.

3. The method of claim 1 further comprises blurring the input image using a Gaussian function.

4. The method of claim 3 receiving an input indicating a degree of privacy protection and blurring the input image in accordance with the input, where the input correlates to standard deviation of the Gaussian function.

5. The method of claim 1 wherein generating a checkboard pattern includes calculating size of each square in the checkboard pattern as a function of an anticipated viewing distance between the display device and a user, pixel density of the display device, and size of content to be displayed on the display device.

6. The method of claim 1 wherein generating a checkboard pattern includes sizing each square of the checkboard pattern to be size of one pixel of the display device.

7. The method of claim 1 wherein blurring the input image and generating a checkerboard pattern is performed concurrently.

8. The method of claim 1 wherein the steps of computing a complementary image, a delta image and a protected image are performed on an entire image or subset thereof.

9. A non-transitory computer-readable medium having computer-executable instructions that, upon execution of the instructions by a processor of a computer, cause the computer to:

receive an input image to be displayed on a display device;

blur the input image to create a target image;

compute a complementary image as follows $$\text{complement} = (targ^{2*}2) - img^2$$

where targ is the target image, img is the input image and complement is the complementary image;

generate a checkerboard pattern having dimensions same as the input image;

compute a delta image as follows $$\text{delta} = (\text{complement} - img^2)^* \text{grid}$$

where grid is the checkboard pattern and delta is the delta image;

compute a protected image as follows $$newimg = \text{square root of } (img^2 + \text{delta})$$

where newimg is the protected image; and display the protected image on the display device.

10. The non-transitory computer-readable medium of claim 9 having computer-executable instructions that further cause the computer to decrease contrast of the input image and thereby increase privacy protection.

11. The non-transitory computer-readable medium of claim 9 having computer-executable instructions that further cause the computer to blur the input image using a Gaussian function.

12. The non-transitory computer-readable medium of claim 9 having computer-executable instructions that further cause the computer to receive an input indicating a degree of privacy protection and blur the input image in accordance with the input, where the input correlates to standard deviation of the Gaussian function.

13. The non-transitory computer-readable medium of claim 9 having computer-executable instructions that further cause the computer to generate a checkboard pattern by calculating size of each square in the checkboard pattern as a function of an anticipated viewing distance between the display device and a user, pixel density of the display device, and size of content to be displayed on the display device.

14. The non-transitory computer-readable medium of claim 9 having computer-executable instructions that further cause the computer to generate a checkboard pattern includes sizing each square of the checkboard pattern to be size of one pixel of the display device.

15. The non-transitory computer-readable medium of claim 9 having computer-executable instructions that further cause the computer to blur the input image and generate a checkerboard pattern concurrently.

16. The non-transitory computer-readable medium of claim 9 having computer-executable instructions that further cause the computer to compute a complementary image, a delta image and a protected image for an entire image or subset thereof.

* * * * *